United States Patent
Clardy et al.

[15] 3,653,844
[45] Apr. 4, 1972

[54] GAS PURIFICATION APPARATUS

[72] Inventors: Edwin K. Clardy; Wilbur G. Ragains, both of Bartlesville, Okla.

[73] Assignee: Philips Petroleum Company

[22] Filed: Feb. 2, 1970

[21] Appl. No.: 7,664

[52] U.S. Cl. ............... 23/288 M, 23/2 S, 23/4, 23/288 F, 23/288 J, 55/387
[51] Int. Cl. ............... B01d 53/34, B01j 1/22, B01j 9/04
[58] Field of Search .............. 23/288 M, 288 F, 288 J, 288 H, 23/288 K, 2 E, 2 S, 4, 254, 254 E; 431/268; 55/387, 74

[56] References Cited

UNITED STATES PATENTS

| | | | |
|---|---|---|---|
| 1,036,609 | 8/1912 | Grosvenor | 23/288 K X |
| 2,396,190 | 3/1946 | Morgan et al. | 23/288 F X |
| 3,479,144 | 11/1969 | Brose | 23/288 F |
| 3,490,878 | 1/1970 | Russell | 23/288 F |
| 2,873,071 | 2/1959 | Bratton | 23/288 F UX |
| 3,271,326 | 9/1966 | Forney et al. | 23/288 M X |
| 3,507,627 | 4/1970 | Frant et al. | 23/288 M |
| 3,357,916 | 12/1967 | Smith | 23/288 M X |
| 1,970,700 | 8/1934 | Kendall | 23/288 F UX |
| Re. 25,858 | 9/1965 | Matvay | 23/288 F X |
| 3,353,923 | 11/1967 | Peters | 23/288 M |

*Primary Examiner*—Joseph Scovronek
*Attorney*—Young and Quigg

[57] ABSTRACT

Apparatus is provided for purifying gaseous streams of contaminants, the apparatus being adapted to raise the gaseous stream to the necessary temperature and to pass the gas in contact with an active agent selected in view of the contaminant to be removed.

1 Claims, 1 Drawing Figure

Patented April 4, 1972
3,653,844
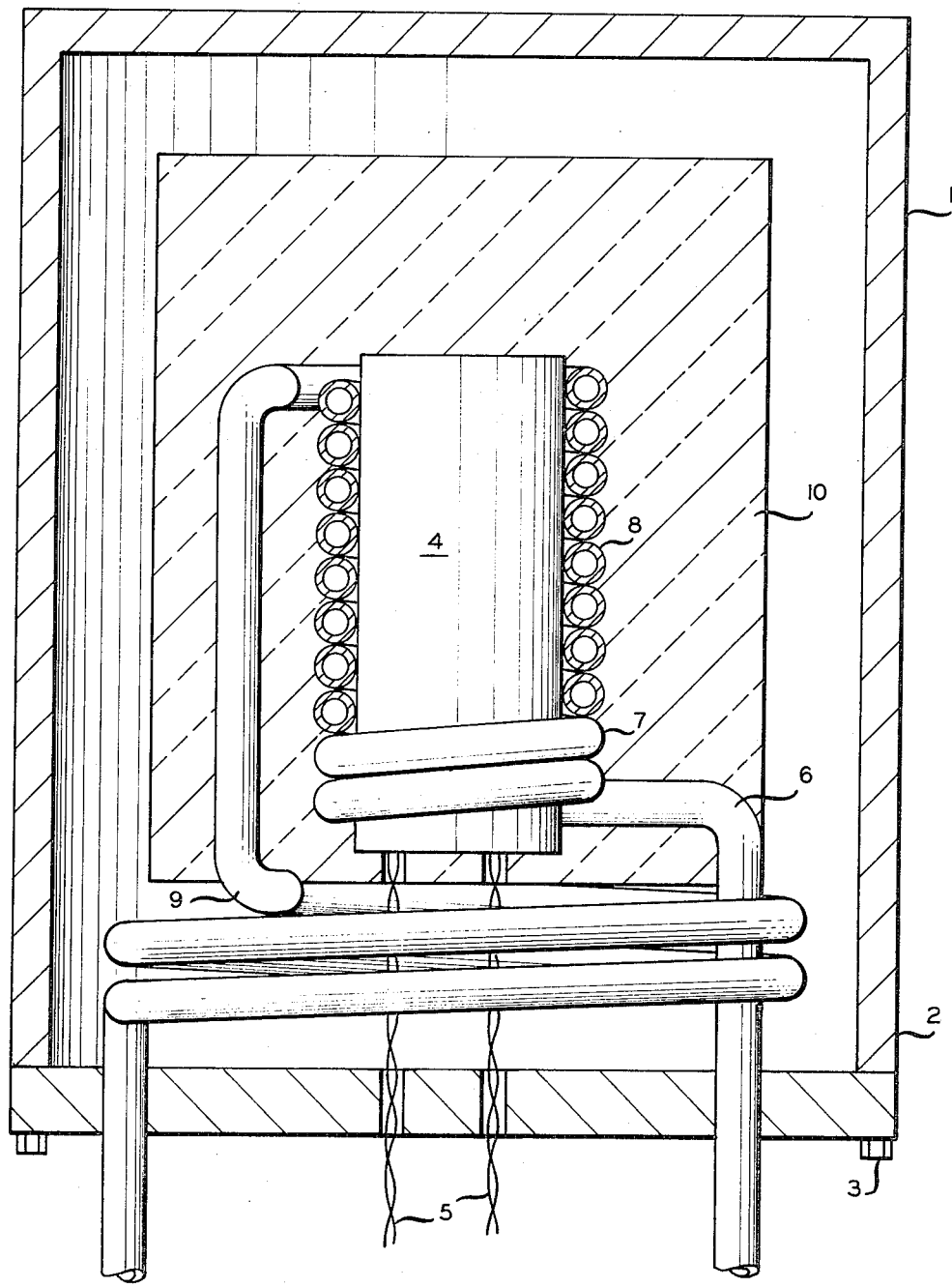
INVENTORS
E. K. CLARDY
W. G. RAGAINS
BY
ATTORNEYS

GAS PURIFICATION APPARATUS

This invention pertains to air purification.

In one of its more specific aspects, this invention pertains to apparatus for purifying air, particularly that used for analytical purposes.

For certain usages, it is desirable that air be available in a highly pure state. For example, the air supplied to a flame ionization detector must be substantially free of hydrocarbons and other interfering components. Since air is frequently required by analytical equipment in petroleum refineries, the presence of hydrocarbons in the air is to be expected.

There has now been discovered apparatus which is particularly effective in purifying air and other gases of such hydrocarbons and other contaminants.

According to this invention, there is provided gaseous stream purification apparatus comprising a catalyst-containing conduit adapted for passage therethrough of the gaseous stream to be purified, heating means adapted to heat the gas passing through the catalyst-containing conduit, the catalyst contained in the conduit being selected to absorb a principal portion of the contaminants contained within the gaseous stream.

Accordingly, it is an object of this invention to provide efficient, compact apparatus for contaminate removal from gaseous streams.

It is also an object of this invention to provide low cost apparatus of integrated construction for the purification of gaseous streams.

The apparatus of the present invention is particularly adapted for purification of air supplied to flame ionization detectors, the air being purified of all contaminants which interfere with the performance of the detectors. More generally, however, the apparatus of this invention is adapted for the purification of gaseous streams of any composition of materials responsive to the surfaces of the purifying agents or catalysts with which the gaseous stream is contacted and allows, due to the employment of a catalyst, operational temperatures below those necessary for purification of the gases in the absence of the catalyst. Such lower operating temperatures contribute to the longer life of the apparatus.

The apparatus of this invention will be more easily understood by referring to the attached drawing which is a cross-sectional view, in elevation, of one embodiment of this invention.

Referring now to the drawing, there is shown enclosed housing or chamber 1 which is preferably an explosion-proof enclosure complying with NEMA explosion-proof requirements. It is of any size and configuration and is preferably adapted with cover 2 positioned in closing relationship to the housing in any suitable manner, for example, by bolts 3.

Positioned within the housing and supported therein in any suitable manner is heat source 4. This heat source is preferably an electrical heating element, electric power being supplied thereto by power leads 5. Current is supplied by these leads at any voltage necessary to raise the gas being purified to the desired temperature.

Positioned in heat-absorbing relationship with the heat source, preferably coiled in contact with the heating element, is conduit section 8 of conduit 6. Surrounding conduit section 8 and heat source 4 is a high temperature insulation mass 10 which facilitates heat transfer between the heat source and the coil and minimizes heat loss from the apparatus.

Conduit 6 enters the housing at any desired point and is coiled around heat source 4 to provide a heating surface sufficient to raise the temperature of the gas passed through the conduit to the desired temperature, generally about 1400°-1450° F.

This conduit is preferably composed of a plurality of sections, preferably three sections, these being a metallic inlet section 7, a metallic, ceramic-lined central section 8, and a metallic outlet section 9.

Inlet section 7 of conduit 6 is preferably metallic over that length entering the housing and through a sufficient portion of its length in contact with the heat source to bring the gas to the desired temperature. In the central section thereafter, the conduit is preferably of ceramic-lined metallic construction.

The central metallic section 8 will be ceramic-lined over a length sufficient to provide adequate contact between the purification means or catalyst deposited on the ceramic material and the gas which is brought into contact with the catalyst. The nature of the catalyst deposited on the ceramic of the ceramic-lined conduit will depend on the nature of the impurities to be removed. If a gaseous stream is to be purified of hydrocarbon contaminants, a cupric oxide catalyst deposit is employed. For the removal of other impurities, the ceramic coating can have coated on it, so as to be exposed to the gaseous stream passing through it, such particulate materials as activated carbon, platinum compounds, manganese dioxide, noble metal catalysts and the like.

The nature of the catalyst-coated ceramic surface can vary. In certain instances, it will be comprised of a ceramic lining having a surface coating of an active catalyst or agent adhering thereto in any suitable manner. In other instances, the ceramic employed to line the conduit will have incorporated in it a quantity of active agent with which the gas stream comes in contact.

The outlet section 9 of the conduit will preferably be metallic so as to radiate heat from the purified gas, thus facilitating its being cooled to the temperature at which it is to be used. For this purpose, outlet section 9 can be positioned in contact with inlet portion 7 to effect heat exchange therebetween, or outlet section 9 can be positioned with its principal portion exterior of the insulation mass, as coils of large diameter, to maximize its surface and hence, the amount of heat radiated from the gas.

In another embodiment of this invention, the apparatus can be of the same general configuration of that shown in the drawing. However, in this instance conduit 6 is of unitary construction, preferably of a high-temperature metal throughout its length, with that portion immediately after that portion in which the gas attains the desired temperature being packed with a suitable catalytic material, for example, in the form of a packed bed. Such materials include all conventionally employed agents of any nature whatsoever, both of the supported and nonsupported type.

The gas treated in the apparatus of this invention can be introduced into the coil, so as to produce the desired pressure at the outlet from the coil in view of the pressure drop to be encountered in passage of the gas through the coil. Auxiliary heat exchanger or cooling equipment for cooling the treated gaseous stream exteriorly of the housing or chamber can also be employed.

In the operation of the apparatus of this invention, with the heater in operation, the gas to be purified is introduced into, and passed through, the coil, being brought into contact with the purifying agent upon its passage therethrough. The purified stream emitted from the outlet section of the coil is conducted to a point of usage. Rheostat means located in the power leads to the heat source can be employed to regulate the temperature of the gas upon its passage through the coil.

It will be evident from the foregoing that various modifications can be made to the apparatus of this invention. Such, however, are considered within the scope of the invention.

What is claimed is:

1. Gas purification apparatus comprising a housing, an electrical heat source means positioned within said housing and a conduit comprising an inlet section, an outlet section and a central section positioned within said housing, said inlet and outlet sections extending exteriorily of said housing and having metallic interior surfaces, said central section being coiled in contact with said heat source means and adapted for heat transfer from said heat source means thereto, the interior walls of said central section being adapted with a ceramic coating comprising a catalyst positioned proximate the surface of said coating and adapted for contact by a gaseous stream upon passage through said conduit.